US009584702B2

(12) United States Patent
Sano et al.

(10) Patent No.: US 9,584,702 B2
(45) Date of Patent: Feb. 28, 2017

(54) IMAGE PROCESSING APPARATUS FOR CORRECTING COLOR INFORMATION AND METHOD THEREFOR

(71) Applicant: KABUSHIKI KAISHA TOSHIBA, Minato-ku, Tokyo (JP)

(72) Inventors: Yuma Sano, Kawasaki (JP); Ryosuke Nonaka, Yokohama (JP); Masahiro Baba, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 222 days.

(21) Appl. No.: 14/328,307

(22) Filed: Jul. 10, 2014

(65) Prior Publication Data

US 2015/0015597 A1  Jan. 15, 2015

(30) Foreign Application Priority Data

Jul. 11, 2013  (JP) .................................. 2013-145829

(51) Int. Cl.
*H04N 1/60* (2006.01)
(52) U.S. Cl.
CPC ................................. *H04N 1/6058* (2013.01)
(58) Field of Classification Search
CPC ................................................... H04N 1/6058
See application file for complete search history.

(56) References Cited

U.S. PATENT DOCUMENTS

| 6,134,375 A * | 10/2000 | Naganawa ........... H04N 9/8047 386/306 |
| 6,229,916 B1 * | 5/2001 | Ohkubo ............... H04N 1/6052 358/520 |
| 2004/0119995 A1 * | 6/2004 | Nishi ................... H04N 1/6027 358/1.9 |

(Continued)

FOREIGN PATENT DOCUMENTS

| EP | 0 215 815 | 4/1987 |
| JP | 2006-173825 | 6/2006 |

(Continued)

OTHER PUBLICATIONS

Fairchild et al., "Predicting the Lightness of Chromatic Object Colors Using CIELAB", Dec. 1991, Color Research & Application, vol. 16, No. 6, pp. 385-393.*

(Continued)

*Primary Examiner* — Jacinta M Crawford
*Assistant Examiner* — Jonathan M Cofino
(74) *Attorney, Agent, or Firm* — Nixon & Vanderhye, P.C.

(57) ABSTRACT

According to one embodiment, there is provided an image processing apparatus including: first circuitry and second circuitry. The first circuitry sets for first color information in a first color gamut a correction quantity of a brightness defined depending on a lightness and a chroma of the first color information on a basis of a difference between a target brightness and the brightness of the first color information. The second circuitry corrects at least one of the lightness and (Continued)

the chroma of the first color information such that the brightness of the first color information is corrected by the correction quantity to obtain corrected color information in the first color gamut.

10 Claims, 8 Drawing Sheets

(56) References Cited

U.S. PATENT DOCUMENTS

| | | | | |
|---|---|---|---|---|
| 2008/0068626 A1* | 3/2008 | Bala | ............... | H04N 1/6058 |
| | | | | 358/1.9 |
| 2008/0266315 A1* | 10/2008 | Im | ............... | G09G 3/2003 |
| | | | | 345/590 |
| 2011/0013208 A1* | 1/2011 | Bhaskaran | ............ | H04N 1/6027 |
| | | | | 358/1.9 |
| 2012/0242680 A1* | 9/2012 | Park | ............... | G09G 3/3233 |
| | | | | 345/590 |
| 2013/0050245 A1* | 2/2013 | Longhurst | ............... | H04N 9/67 |
| | | | | 345/590 |
| 2014/0092122 A1 | 4/2014 | Sano et al. | | |

FOREIGN PATENT DOCUMENTS

| | | |
|---|---|---|
| JP | 2012-222616 | 11/2012 |
| JP | 2014-072855 | 4/2014 |
| WO | 86/04646 | 8/1986 |
| WO | 2011/021241 | 2/2011 |

OTHER PUBLICATIONS

English-language machine translation of JP 2012-222616.
"Chroma Enhancement Method Considering Effect of Lightness and Hue—Go TANAKA," The Institute of Electronics, Information and Communication Engineers Technical Report SIS2012-32 (Dec. 2012), pp. 19-22; and partial English-language machine translation.
English-language machine translation of WO2011/021241.

* cited by examiner

IMAGE PROCESSING APPARATUS FOR CORRECTING COLOR INFORMATION AND METHOD THEREFOR

CROSS-REFERENCE TO RELATED APPLICATIONS

This application is based upon and claims the benefit of priority from Japanese Patent Application No. 2013-145829, filed Jul. 11, 2013; the entire contents of which are incorporated herein by reference.

FIELD

Embodiments described herein relate to an image processing apparatus and a method therefor.

BACKGROUND

There has been discussed a method for performing color conversion with taking into account human visual feature when color information existing in a color gamut is displayed on a display device having a color gamut different therefrom. For example, there has been known a method for performing color conversion on a color of the wide color gamut such that hue and gradation property perceived by a human are constant with taking into account the human visual feature in order to display the color information having a wide color gamut on an image display device having a narrow color gamut.

However, this method has a difficulty in that although the color information displayed on the image display device having the narrow color gamut seems to be equivalent to the color information having the wide color gamut in the hue and the gradation property, the chroma may decrease accompanying the brightness decreasing as compared with the color information having the wide color gamut.

DETAILED DESCRIPTION

According to one embodiment, there is provided an image processing apparatus including: first circuitry and second circuitry.

The first circuitry sets for first color information in a first color gamut a correction quantity of a brightness defined depending on a lightness and a chroma of the first color information on a basis of a difference between a target brightness and the brightness of the first color information.

The second circuitry corrects at least one of the lightness and the chroma of the first color information such that the brightness of the first color information is corrected by the correction quantity to obtain corrected color information in the first color gamut.

Below, a description is given of embodiments of the present invention with reference to the drawings.

First Embodiment

Figure 1:
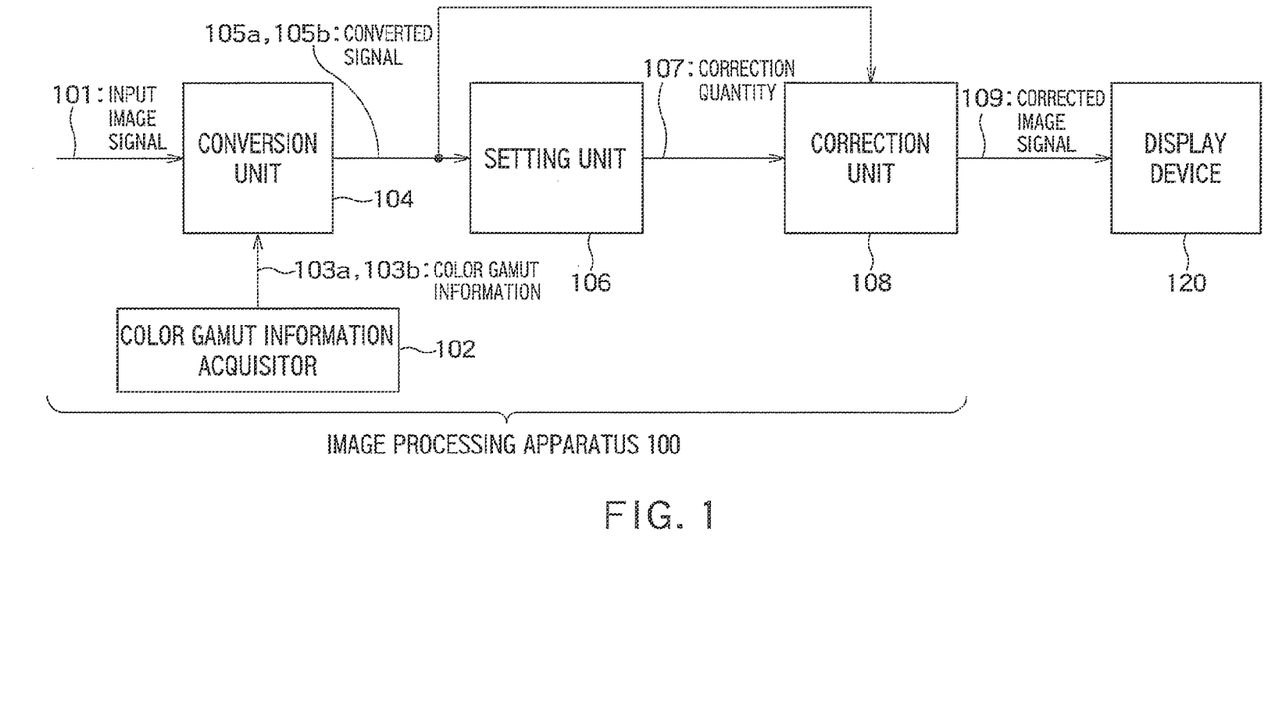
FIG. 1 is a diagram of an image display device according to a first embodiment.

FIG. 1 is a block diagram of an image display device according to a first embodiment.

This image display device includes an image processing apparatus 100 and a display device 120 according to the embodiment. The image processing apparatus 100 includes a color gamut information acquisitor 102, a conversion unit 104, a setting unit 106, and a correction unit 108.

The color gamut information acquisitor 102 acquires color gamut information 103a and 103b from the outside or holds in the inside thereof in advance, and sends the color gamut information 103a and 103b to the conversion unit 104. The color gamut information acquisitor 102 may read the color gamut information 103a and 103b from a storage not shown or acquire the color gamut information 103a and 103b via a user interface. The color gamut information 103a is color gamut information held by an input image signal 101 to be input to the image processing apparatus 100. The color gamut information 103b is color gamut information for the display device 120 which displays an image. A color gamut of the display device 120 (first color gamut) is narrower than a color gamut of an input image (second color gamut). For example, the color gamut of the display device 120 is encompassed by the color gamut of the input image. However, not all the color gamut of the display device 120 may be encompassed by the color gamut of the input image, but a part thereof may be encompassed in some cases.

The conversion unit 104 performs color conversion on the input image signal 101 on the basis of the color gamut information 103a to acquire a converted signal 105a representing lightness, chroma, and hue, and sends the converted signal 105a to the setting unit 106. The conversion unit 104 performs the color conversion on the input image signal 101 on the basis of the color gamut information 103b to acquire a converted signal 105b representing lightness, chroma, and hue, and sends the converted signal 105b to the setting unit 106.

The setting unit 106 calculates a correction quantity of brightness in the converted signal 105b, more specifically, a correction quantity 107 of at least one of the lightness and the chroma, and sends the calculated correction quantity 107 to the correction unit 108.

The correction unit 108 corrects the converted signal 105b in accordance with the correction quantity 107 to obtain a corrected image signal 109. The correction unit 108 outputs the corrected image signal 109 to the display device 120.

The display device 120 displays the corrected image signal 109 input from the correction unit 108. In the embodiment, a case where the display device 120 is a liquid crystal display is described as an example. However, the display device 120 may be a plasma display or CRT display, and may be a projection type device such as a projector.

Next, a description is given of an operation of the image processing apparatus 100 in the embodiment.

Figure 2:
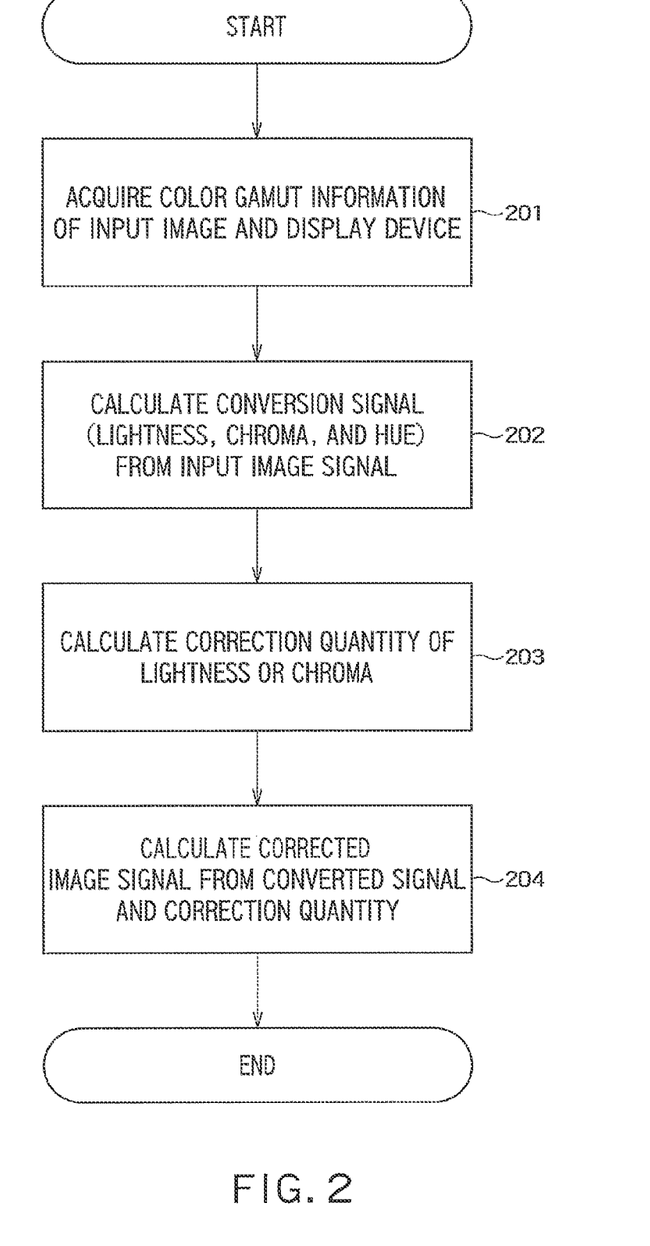
FIG. 2 is a flowchart of an operation according to the first embodiment.

FIG. 2 is a flowchart showing the operation of the image processing apparatus 100 in the embodiment.

First, the color gamut information acquisitor 102 acquires the color gamut information 103a of the input image signal 101 and the color gamut information 103b of the display device 120 and sends these to the conversion unit 104 (S201).

The embodiment assumes that the color gamut of the display device 120 is a color gamut defined by ITU-R BT.709 which is a common color gamut for a display device such as a LCD. On the other hand, assumed is that the color gamut of the input image signal is a color gamut defined by ITU-R BT.2020 which is wider than the color gamut of the display device 120. These exemplary color gamuts are included in an example of a case where the color gamut of the input image signal 101 is wider than that of the display device 120. The color gamuts of the display device 120 and the input image 101 are not limited to ITU-R BT.709 and ITU-R BT.2020.

The conversion unit 104 converts the input image signal 101 into the converted signals 105a and 105b representing the lightness, chroma, and hue (S202).

Specifically, the conversion unit 104 first performs gamma conversion of Formula 1 on a gradation value for each of R, G, and B subpixels of each pixel of the input image signal 101 input in an RGB format.

$$R_{in} = \left(\frac{R'_{in}}{255}\right)^{\gamma} \quad (1)$$

$$G_{in} = \left(\frac{G'_{in}}{255}\right)^{\gamma}$$

$$B_{in} = \left(\frac{B'_{in}}{255}\right)^{\gamma}$$

Where, $R_{in}'$, $G_{in}'$, and $B_{in}'$ are the gradation values of the R, G, and B subpixels respectively in an input video signal, and the gradation value is represented by 8-bits (0 to 255). $R_{in}$, $G_{in}$, and $B_{in}$ are the gradation values obtained by performing the gamma conversion on $R_{in}'$, $G_{in}'$, and $B_{in}'$, and represented using relative values from 0 to 1. "$\gamma$" represents a gamma coefficient.

Here, a configuration for performing the gamma conversion by Formula 1 is shown. However, as another method, a look-up table is prepared in which an input gradation value and a gradation value after the gamma conversion are associated with each other in advance and a gamma conversion operation may be performed by referring the look-up table. The above gamma conversion is performed on the values of the R, G, and B subpixels respectively of all pixels in the input video signal.

The conversion unit 104 receives from the color gamut information acquisitor 102 the color gamut information 103a of BT.2020 as the color gamut of the input image and the color gamut information 103b of BT.709 as the color gamut of the display device.

The conversion unit 104 calculates, from the color gamut information 103a and the input image signal 101, tristimulus values ($X_{709}$, $Y_{709}$, $Z_{709}$) converted on the basis of the color gamut defined by BT.709. Also, calculated, from the color gamut information 103b and the input image signal 101, are tristimulus values ($X_{2020}$, $Y_{2020}$, $Z_{2020}$) converted on the basis of the color gamut defined by BT.2020.

A calculation formula for the tristimulus values ($X_{709}$, $Y_{709}$, $Z_{709}$) is represented by Formula 2A, and a calculation formula for the tristimulus values ($X_{2020}$, $Y_{2020}$, $Z_{2020}$) is represented by Formula 2B.

$$\begin{bmatrix} X_{709} \\ Y_{709} \\ Z_{709} \end{bmatrix} = M \begin{bmatrix} R_{in} \\ G_{in} \\ B_{in} \end{bmatrix} \quad (2A)$$

$$\begin{bmatrix} X_{2020} \\ Y_{2020} \\ Z_{2020} \end{bmatrix} = N \begin{bmatrix} R_{in} \\ G_{in} \\ B_{in} \end{bmatrix} \quad (2B)$$

Where, "M" is a color converting matrix of 3×3 representing the color gamut information 103a, which is the converting matrix for conversion correspondingly to a maximum color reproducing area reproduced by a color gamut BT.709. "N" is a color converting matrix of 3×3 representing the color gamut information 130b, which is the converting matrix for conversion correspondingly to a maximum color reproducing area reproduced by a color gamut BT.2020.

Here, the color converting matrix is held for calculating the tristimulus values, which are calculated for each pixel from $R_{in}$, $G_{in}$, and $B_{in}$. As another method, a relationship between the tristimulus values obtained by the color conversion, and $R_{in}'$, $G_{in}'$, and $B_{in}'$ is held in the look-up table, and the tristimulus values may be found for each pixel from $R_{in}'$, $G_{in}'$, and $B_{in}'$ by referring the look-up table.

In a case where the input image signal is input in a format other than the RGB such as YUV, the XYZ tristimulus values may be found by referring the LUT for converting into the XYZ tristimulus values directly from an input signal value of the YUV or the like.

Next, the tristimulus values $X_{709}$, $Y_{709}$ and, $Z_{709}$ calculated by the color conversion are converted into $L^*_{709}$, $a^*_{709}$, and $b^*_{709}$ of a CIE L*a*b* color space. $L^*_{709}$, $a^*_{709}$, and $b^*_{709}$ are calculated in accordance with Formula 3.

$$L^*_{709} = 116 \times f\left(\frac{Y_{709}}{Y_w}\right) - 16 \quad (3)$$

$$a^*_{709} = 500 \times \left\{f\left(\frac{X_{709}}{X_w}\right) - f\left(\frac{Y_{709}}{Y_w}\right)\right\}$$

$$b^*_{709} = 200 \times \left\{f\left(\frac{Y_{709}}{Y_w}\right) - f\left(\frac{Z_{709}}{Z_w}\right)\right\}$$

Here, $f(Y_{709}/Y_w)$ is calculated as shown in Formula 4, and $f(X_{709}/X_w)$ and $f(Z_{709}/Z_w)$ are also calculated similarly.

$$f\left(\frac{Y_{709}}{Y_w}\right) = 7.787 \times \left(\frac{Y_{709}}{Y_w}\right) + \frac{16}{116} \left(\frac{Y_{709}}{Y_w} \leq 0.008856\right) \quad (4)$$

$$f\left(\frac{Y_{709}}{Y_w}\right) = \left(\frac{Y_{709}}{Y_w}\right)^{\frac{1}{3}}$$

$X_w$, $Y_w$, and $Z_w$ represent the tristimulus values of a perfect reflecting diffuser. Further, $a^*_{709}$ and $b^*_{709}$ are converted by Formula 5 into a chroma $C^*_{709}$ and a hue $h_{709}$.

$$C^*_{709} = \{(a^*_{709})^2 + (b^*_{709})^2\}^{\frac{1}{2}} \quad (5)$$

$$h_{709} = \tan^{-1}\left(\frac{b^*_{709}}{a^*_{709}}\right)$$

Similar to Formula 3 to Formula 5, a lightness $L^*_{2020}$, a chroma $C^*_{2020}$, and a hue $h_{2020}$ are also calculated from the tristimulus values $X_{2020}$, $Y_{2020}$ and, $Z_{2020}$.

The input image color information (lightness $L^*_{2020}$, chroma $C^*_{2020}$, and hue $h_{2020}$) calculated in this way are sent as the converted signal 105a to the setting unit 106 and the correction unit 108. The display device color information (lightness $L^*_{709}$, chroma $C^*_{709}$, and hue $h_{709}$) are sent as the converted signal 105b to the setting unit 106 and the correction unit 108.

Next, the setting unit 106 calculates the correction quantity 107 of the lightness and chroma in the converted signal 105b from the converted signals 105a and 105b (S203).

Specifically, first, the setting unit 106 calculates brightness perceived respectively for the input image color information ($L^*_{2020}$, $C^*_{2020}$, and $h_{2020}$) and the display device color information ($L^*_{709}$, $C^*_{709}$, and $h_{709}$).

Here, the perceived brightness is described. As is known as the Helmholtz-Kohlrausch effect, human eyes generally perceive that a chromatic color is brighter than an achromatic color if the lightness is the same, and perceive that the more vivid, the brighter.

The embodiment assumes that, on the basis of the Helmholtz-Kohlrausch effect, a brightness B* perceived by the human eyes is defined depending on a lightness L*, chroma C*, and hue h of a target object in accordance with Formula 6.

$$B^* = L^* + (F(h)+T) \times C^* \quad (6)$$

However, "F" is a function for outputting values different depending on the hue, and "T" is a constant. In accordance with Formula 6, a brightness $B^*_{2020}$ with which the color information of the input image is perceived is calculated as Formula 7A. Similarly, in accordance with Formula 6, a brightness $B^*_{709}$ with which the color information in the display device 120 is perceived is calculated as Formula 7B.

$$B^*_{2020}(L^*_{2020}, C^*_{2020}, h_{2020}) = L^*_{2020} + (F(h_{2020})+T) \times C^*_{2020} \quad (7A)$$

$$B^*_{709}(L^*_{709}, C^*_{709}, h_{709}) = L^*_{709} + (F(h_{709})+T) \times C^*_{709} \quad (7B)$$

Further, a difference ΔB* between both perceived brightnesses is calculated as the correction quantity of the brightness. The difference ΔB* between the brightness $B^*_{2020}$ ($L^*_{2020}$, $C^*_{2020}$, $h_{2020}$) with which the color information of the input image is perceived and the brightness $B^*_{709}$ ($L^*_{709}$, $C^*_{709}$, $h_{709}$) with which the color information of the display device 120 is perceived is calculated as Formula 8.

$$\begin{aligned}\Delta B^* &= B^*_{2020}(L^*_{2020}, C^*_{2020}, h_{2020}) - \\ &\quad B^*_{709}(L^*_{709}, C^*_{709}, h_{709}) \\ &= (L^*_{2020} - L^*_{709}) + (F(h_{2020})+T) \times \\ &\quad C^*_{2020} - (F(h_{709})+T) \times C^*_{709}\end{aligned} \quad (8)$$

Next, from the difference ΔB* between the perceived brightnesses, correction quantities ΔL* and ΔC* of the lightness and chroma are set with respect to the color information ($L^*_{709}$, $C^*_{709}$, $h_{709}$) in the display device 120.

For example, if the difference ΔB* (correction quantity of the brightness) between the perceived brightnesses is entirely corrected using the lightness, the correction quantity ΔL* of the lightness and the correction quantity ΔC* of the chroma are calculated as Formula 9 in consideration of Formula 6.

$$\Delta L^* = \Delta B^* \quad$$

$$\Delta C^* = 0 \quad (9)$$

On the other hand, if the difference ΔB* between the perceived brightnesses is entirely corrected using the chroma, the correction quantity ΔL* of the lightness and the correction quantity ΔC* of the chroma are calculated as Formula 10 in consideration of Formula 6.

$$\Delta L^* = 0 \quad (10)$$

$$\Delta C^* = \frac{\Delta B^*}{(F(h_{709})+T)}$$

Color information ($L^*_L$, $C^*_L$, $h_L$) having the difference ΔB* between the perceived brightnesses with only the lightness being corrected is calculated as Formula 11A. Color information ($L^*_C$, $C^*_C$, $h_C$) having the difference ΔB* between the perceived brightnesses with only the chroma being corrected is calculated as Formula 11B.

$$L^*_L = L^*_{709} + \Delta B^* \quad (11A)$$
$$C^*_L = C^*_{709}$$
$$h_L = h_{709}$$

$$L^*_C = L^*_{709} \quad (11B)$$
$$C^*_C = C^*_{709} + \frac{\Delta B^*}{(F(h_{709})+T)}$$
$$h_C = h_{709}$$

Figure 3:
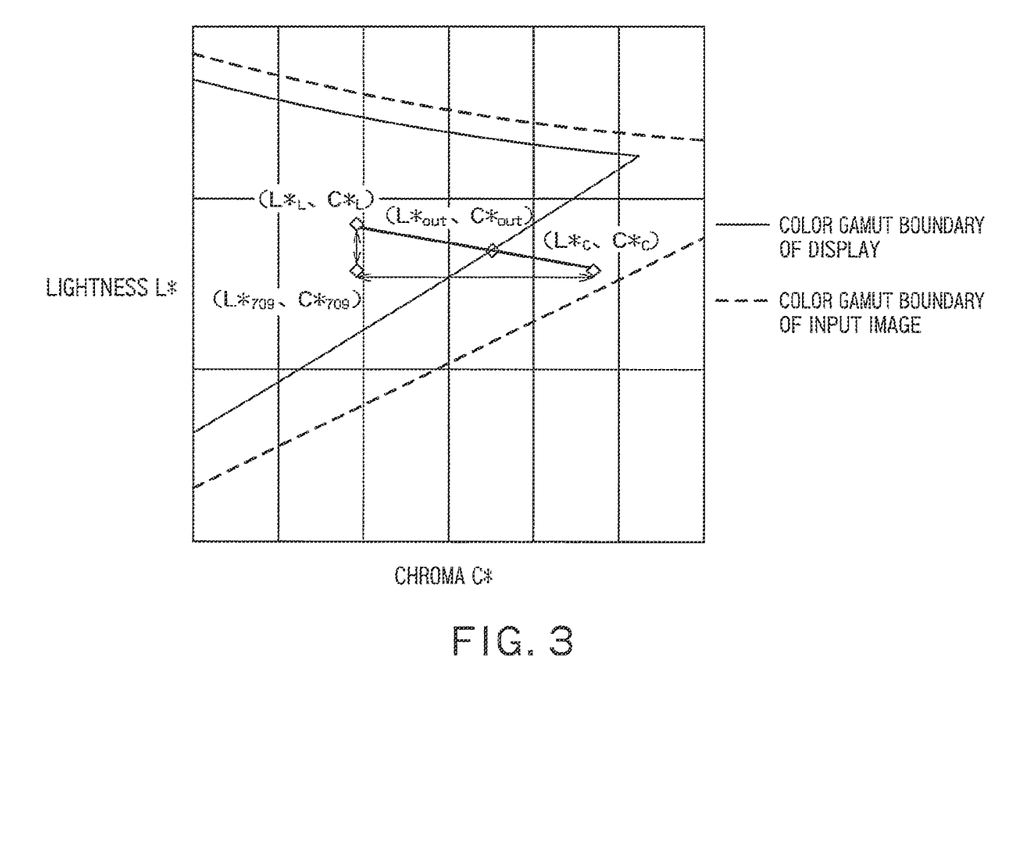
FIG. 3 is an illustration of a correction method of lightness and chroma according to the first embodiment.

Here, FIG. 3 shows, in the color reproducing area represented by the lightness, chroma, and hue, the color information ($L^*_{709}$, $C^*_{709}$, $h_{709}$) in the display device 120, the color information ($L^*_L$, $C^*_L$, $h_L$) with only the lightness being corrected, and the color information ($L^*_C$, $C^*_C$, $h_C$) with only the chroma being corrected. A horizontal axis indicates the chroma and a vertical axis indicates the lightness. A solid line represents a color gamut boundary of the display device, and a broken line represents a color gamut boundary of the input image. The color gamut of the input image is wider than the color gamut of the display device.

In FIG. 3, a line connecting the color information ($L^*_L$, $C^*_L$, $h_L$) with the color information ($L^*_C$, $C^*_C$, $h_C$) corresponds to a graph representing a relationship between the lightness and the chroma where the perceived brightness B* represented by Formula 6 is constant. The color information existing on this line has the constant perceived brightness B* represented by Formula 6. For this reason, the color information existing on this line is the same as the color information ($L^*_{2020}$, $C^*_{2020}$, $h_{2020}$) of the input image in the perceived brightness.

Accordingly, the setting unit 106 sets a correction quantity $\Delta L^*_{out}$ of the lightness and a correction quantity $\Delta C^*_{out}$ of the chroma such that the color information after the correction with respect to the color information ($L^*_{709}$, $C^*_{709}$, $h_{709}$) of the display device 120 is positioned on the line connecting the color information ($L^*_L$, $C^*_L$, $h_L$) with the color information ($L^*_C$, $C^*_C$, $h_C$).

For example, the $\Delta L^*_{out}$ and the $\Delta C^*_{out}$ may be a correction quantity for correcting only with the lightness as shown by Formula 9 or a correction quantity for correcting only with the chroma as shown by Formula 10.

A correction quantity for correcting both the lightness and the chroma may be set as shown by Formula 12 by dividing the difference ΔB* between the perceived brightnesses for the lightness and the chroma in accordance with a constant "α" (ratio given in advance). However, "α" is a constant having a value from 0 to 1. In other words, ($L^*_{709}$, $C^*_{709}$, $h_{709}$) is corrected to the color information corresponding to a point which is obtained by internally dividing by the ratio "α" given in advance a portion from point color information ($L^*_L$, $C^*_L$, $h_L$) having the chroma value the same as ($L^*_{709}$, $C^*_{709}$, $h_{709}$) to a point ($L^*_C$, $C^*_C$, $h_C$) having the lightness value the same as ($L^*_{709}$, $C^*_{709}$, $h_{709}$).

$$\Delta L^*_{out} = \Delta B^* \times \alpha \quad (12)$$

$$\Delta C^*_{out} = \frac{\Delta B^* \times (1 - \alpha)}{(F(h_{709}) + T)}$$

The setting unit 106 sends the calculated $\Delta L^*_{out}$ and $\Delta C^*_{out}$ as the correction quantity 107 to the correction unit 108.

The correction unit 108 calculates the corrected image signal 109 from the converted signal 105b and the correction quantity 107 (S204).

Specifically, corrected color information ($L^*_{out}$, $C^*_{out}$, $h^*_{out}$) is calculated from the correction quantity $\Delta L^*_{out}$ of the lightness, the correction quantity $\Delta C^*_{out}$ of the chroma, and the color information ($L^*_{709}$, $C^*_{709}$, $h_{709}$) in accordance with Formula 13. Here, the $\Delta L^*_{out}$ and the $\Delta C^*_{out}$ satisfy Formula 6 for the difference $\Delta B^*$ between the perceived brightnesses calculated in accordance with Formula 8. Therefore, the brightness with which the color information ($L^*_{out}$, $C^*_{out}$, $h^*_{out}$) is perceived is the same as the brightness with which the color information ($L^*_{2020}$, $C^*_{2020}$, $h^*_{2020}$) is perceived. FIG. 3 shows a case where an intersection between the line connecting the color information ($L^*_L$, $C^*_L$, $h_L$) with the color information ($L^*_C$, $C^*_C$, $h_C$) and the color gamut boundary of the display device is ($L^*_{out}$, $C^*_{out}$, $h_{out}$), but not limited thereto. A description is given of a way of calculating the relevant intersection in a second embodiment.

$$L^*_{out} = L^*_{709} + \Delta L^*_{out}$$

$$C^*_{out} = C^*_{709} + \Delta C^*_{out}$$

$$h_{out} = h_{709} \quad (13)$$

The correction unit 108 converts $C^*_{out}$ and $h^*_{out}$ into $a^*_{out}$ and $b^*_{out}$ in accordance with Formula (14).

$$a^*_{out} = C^*_{out} \times \cos(h_{out})$$

$$b^*_{out} = C^*_{out} \times \sin(h_{out}) \quad (14)$$

The correction unit 108 converts $L^*_{out}$, $a^*_{out}$, and $b^*_{out}$ into tristimulus values $X_{out}$, $Y_{out}$, and $Z_{out}$ in accordance with Formula (15).

$$Y_{out} = f\left(\frac{Y}{Y_w}\right) \times \frac{1}{7.787} \times Y_w \quad (15)$$

$$f\left(\frac{Y}{Y_w}\right) \leq 0.206893$$

$$Y_{out} = \left(f\left(\frac{Y}{Y_w}\right)\right)^3 \times Y_w$$

$$0.206893 < f\left(\frac{Y}{Y_w}\right)$$

$X_{out}$ and $Z_{out}$ are also calculated similar to $Y_{out}$. However, $f(X/X_w)$, $f(Y/Y_w)$, and $f(Z/Z_w)$ are calculated as Formula (16).

$$f\left(\frac{X}{X_w}\right) = \frac{a^*}{500} + \frac{(L^* + 16)}{116} \quad (16)$$

$$f\left(\frac{Y}{Y_w}\right) = \frac{(L^* + 16)}{116}$$

$$f\left(\frac{Z}{Z_w}\right) = \frac{(L^* + 16)}{116} - \frac{b^*}{200}$$

The correction unit 108 converts $X_{out}$, $Y_{out}$, and $Z_{out}$ into output signals $R_{out}$, $G_{out}$, and $B_{out}$ in the RGB format in accordance with the color reproducing area of the display device 120 as shown by Formula (17).

$$\begin{bmatrix} R_{out} \\ G_{out} \\ B_{out} \end{bmatrix} = M^{-1} \begin{bmatrix} X_{out} \\ Y_{out} \\ Z_{out} \end{bmatrix} \quad (17)$$

However, "$M^{-1}$" is an inverse matrix of the color converting matrix M of 3×3 shown by Formula (2).

Here, a description is given of a correction method in a case where the RGB signal values $R_{out}$, $G_{out}$, and $B_{out}$ do not fall within a signal value range 0 to 1.

First, a minimum value of the RGB signal values $R_{out}$, $G_{out}$, and $B_{out}$ is represented as $L_{min} = \min(R_{out}, G_{out}, B_{out})$, and an original value of $L_{min}$ is represented as $M_{min}$. In other words, $M_{min}$ is any value of $R_{in}$, $G_{in}$, and $B_{in}$. Here, if $L_{min}$ falls below 0, values of the RGB signal values $R_{out}$, $G_{out}$, and $B_{out}$ are updated in accordance with Formula (18).

Next, a maximum value of the updated RGB signal values $R_{out}$, $G_{out}$, and $B_{out}$ is represented as $L_{max} = \max(R_{out}, G_{out}, B_{out})$, and an original value of $L_{max}$ is represented as $M_{max}$. In other words, $M_{max}$ is any value of $R_{in}$, $G_{in}$, and $B_{in}$. Here, if $L_{max}$ exceeds 1, values of the RGB signal values $R_{out}$, $G_{out}$, and $B_{out}$ are updated in accordance with Formula (19).

Finally, the RGB signal values ($R_{out}$, $G_{out}$, $B_{out}$) are output as the corrected image signal 109.

$$R_{out} = \frac{(0 - M_{min})}{(L_{min} - M_{min})} \times (R_{out} - R_{in}) + R_{in} \quad (18)$$

$$G_{out} = \frac{(0 - M_{min})}{(L_{min} - M_{min})} \times (G_{out} - G_{in}) + G_{in}$$

$$B_{out} = \frac{(0 - M_{min})}{(L_{min} - M_{min})} \times (B_{out} - B_{in}) + B_{in}$$

$$R_{out} = \frac{(1 - M_{max})}{(L_{max} - M_{max})} \times (R_{out} - R_{in}) + R_{in} \quad (19)$$

$$G_{out} = \frac{(1 - M_{max})}{(L_{max} - M_{max})} \times (G_{out} - G_{in}) + G_{in}$$

$$B_{out} = \frac{(1 - M_{max})}{(L_{max} - M_{max})} \times (B_{out} - B_{in}) + B_{in}$$

This correction allows that even if the RGB signal values fall outside a range of 0 to 1 and the represented color is outside the color gamut of the display device, correction can be made to a color on an intersection between a line connecting an original color with a color obtained by correcting the perceived brightness and the color gamut boundary of the display device.

Figure 4:
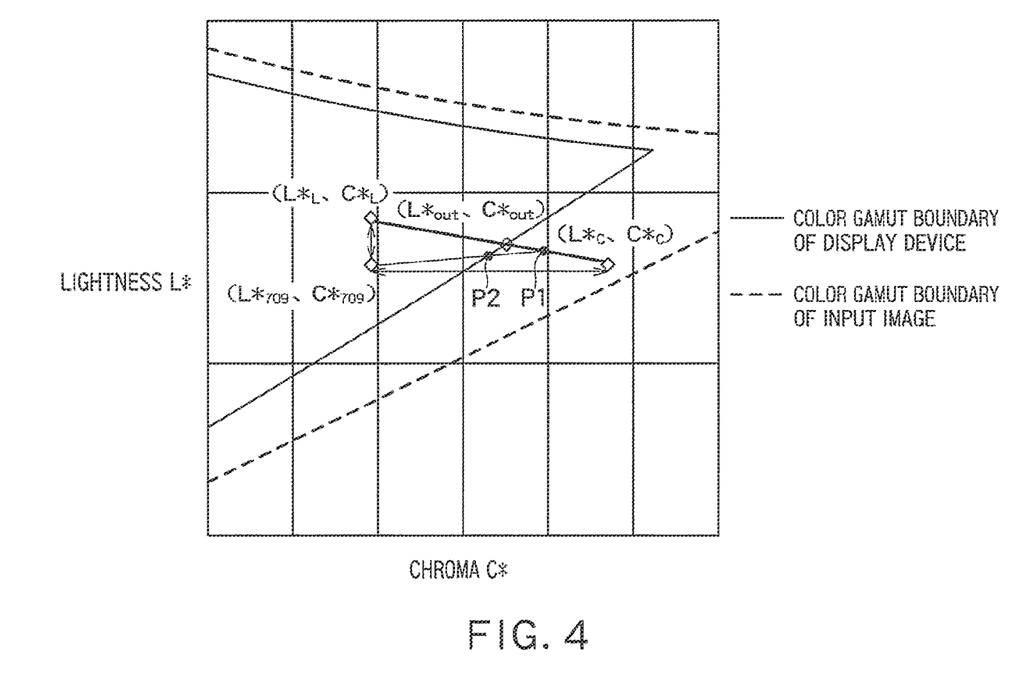
FIG. 4 is an illustration of a correction method of lightness and chroma according to the first embodiment.

Here, the "color obtained by correcting the perceived brightness" is a color whose lightness and chroma are corrected and which exists outside the color gamut of the display device, and corresponds to a point P1 shown in FIG. 4, for example. A process for fitting the point P1 in the color gamut of the display device is the correction in accordance with Formulas 18 and 19, and the point P1 is corrected into a point P2 as a result or the correction of Formulas 18 and 19. In other words, the "color on an intersection between a line connecting an original color with a color obtained by correcting the perceived brightness and the color gamut boundary of the display device" is the point P2 which is an intersection between a line connecting $(L^*_{709}, C^*_{709})$ with the point P1 and the color gamut boundary of the display device. This allows that a point whose lightness and chroma are corrected and which is made to fall outside the color gamut can be plotted on an outline of the color gamut of the display device with the gradation property being maintained. That is, when the point internally divided by the "α" described above is positioned outside the color gamut of the display device, correction is made to the color information corresponding to an intersection between a line connecting the internally divided point with $(L^*_{709}, C^*_{709}, h_{709})$ and the color gamut boundary of the display device.

In the example shown with Formula 12, $(L^*_{709}, C^*_{709}, h_{709})$ is corrected to color information corresponding to the point which is obtained by internally dividing a line connecting the color information $(L^*_L, C^*_L, h_L)$ and $(L^*_C, C^*_C, h_C)$ by the ratio "α" given in advance, but another method may be used as below. That is, a portion, of a line connecting the color information $(L^*_L, C^*_L, h_L)$ and $(L^*_C, C^*_C, h_C)$, included in the color gamut of the display device is identified, and $(L^*_{709}, C^*_{709}, h_{709})$ is corrected to the color information corresponding to a point obtained by internally dividing the identified portion by a ratio given in advance. In this case, the point of the color information after the correction exists in the color gamut of the display device, and thus the process in accordance with Formula 18 and Formula 19 is not necessary.

As described above, according to the embodiment, the display device having the narrow color gamut can also display the color having the perceived brightness the same as the color having the wide color gamut.

Second Embodiment

A description is given of a second embodiment. The embodiment has a general configuration the same as the first embodiment, and thus a difference from the first embodiment is described.

Figure 5:
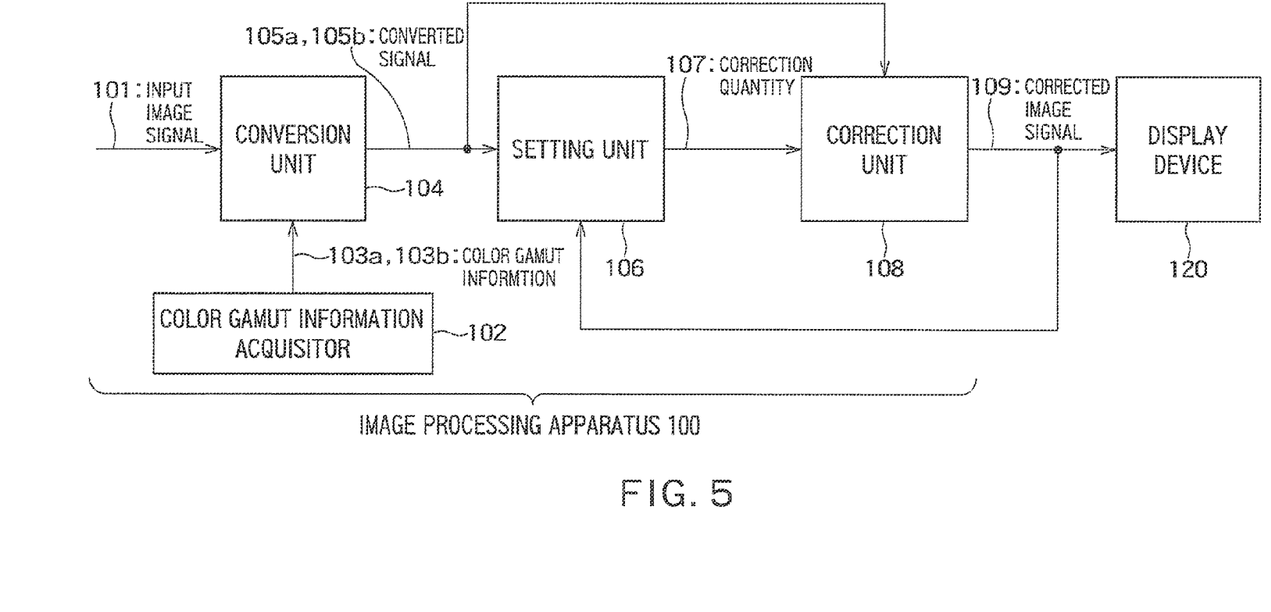
FIG. 5 is a diagram of an image display device according to a second embodiment.

FIG. 5 shows a configuration diagram of an image display device according to the embodiment. Components the same as those in FIG. 1 are denoted by the same reference signs. Differently from FIG. 1, a path is added for feedback from the correction unit 108 to the setting unit 106.

In the first embodiment, the setting unit 106 determines at a time the correction quantity $\Delta L^*_{out}$ of the lightness and the correction quantity $\Delta C^*_{out}$ of the chroma on the basis of the difference $\Delta B^*$ between the perceived brightnesses in accordance with Formula 9 or Formula 10 or Formula 12.

On the other hand, in this embodiment, a process is repeated in which the correction unit 108 returns the corrected image signal calculated from the correction quantity 107 set by the setting unit 106 to the setting unit 106 and the setting unit 106 resets the correction quantity in accordance with the value of the corrected image signal 109. This allows as shown in FIG. 3 the correction quantity $\Delta L^*_{out}$ of the lightness and the correction quantity $\Delta C^*_{out}$ of the chroma to be calculated which may correct the color information $(L^*_{709}, C^*_{709}, h_{709})$ to the color information existing in the color gamut of the display device 120 and having the maximum chroma, that is, the color information of an intersection between the line connecting the color information $(L^*_L, C^*_L, h_L)$ with the color information $(L^*_C, C^*_C, h_C)$ and the color gamut of the boundary of the display device. In this way, the chroma is corrected in priority to the lightness in order that the chroma decrease in the color gamut of the input image is restrained as much as possible while the perceived brightness is made the same as in the color gamut of the input image signal. A case may occur where the chroma after the correction is higher than the chroma in the color gamut of the input image signal, but there is thought to be no difficulty so long as the perceived brightnesses are the same.

The embodiment uses a binary search method as a method for calculating the lightness correction quantity $\Delta L^*_{out}$ and the chroma correction quantity $\Delta C^*_{out}$ such that the corrected color information exists in the color gamut of the display device 120 and the chroma is maximum. However, an algorithm like this for calculating the correction quantity is not limited thereto, and other search algorithm may be used.

The process for calculating by the conversion unit 102 the converted signals 105a and 105b from the input image signal 101 and the color gamut information 103a and 103b is the same as that in the first embodiment and the description thereof is omitted.

Figure 6:
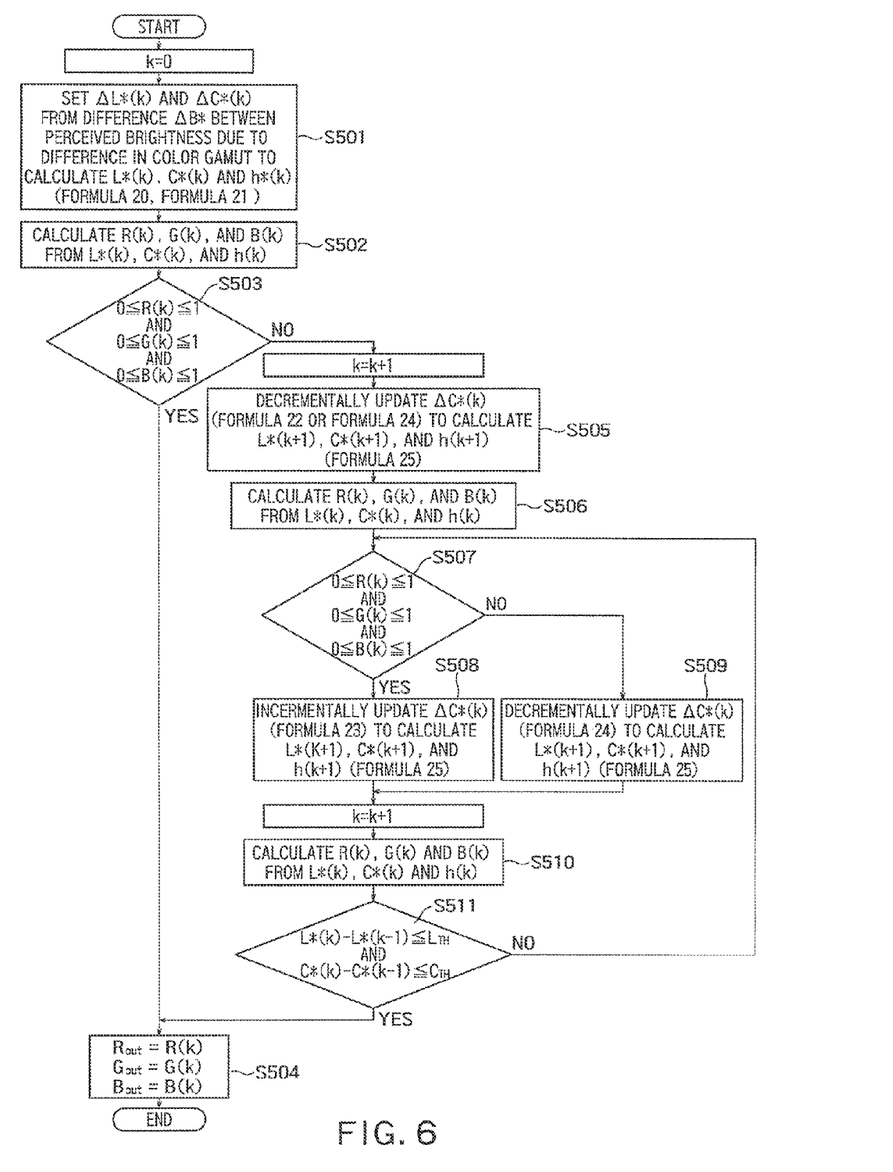
FIG. 6 is a flowchart of an operation according to the second embodiment.

In the following, a description is given of operations of the setting unit 106 and the correction unit 108. FIG. 6 shows a flowchart of the second embodiment.

First, the setting unit 106 calculates the difference $\Delta B^*$ between the perceived brightnesses from the converted signal 105 in accordance with Formula 8, and calculates correction quantity initial values $\Delta L^*(0)$ and $\Delta C^*(0)$ of the lightness and chroma respectively from $\Delta B^*$ as shown in Formula 20 to send to the correction unit 108 (S501). The embodiment sets the correction quantities of the lightness and chroma as the initial values $\Delta L^*(0)$ and $\Delta C^*(0)$ respectively such that the difference $\Delta B^*$ between the perceived brightnesses is entirely corrected using the chroma. The value of $\Delta L^*(0)$ is zero, of course.

$$\Delta C^*(0) = \frac{\Delta B^*}{(F(h_{709}) + T)} \tag{20}$$

$$\Delta L^*(0) = \Delta B^* - \Delta C^*(0) \times (F(h_{709}) + T)$$

The correction unit 108 corrects the color information using $\Delta L^*(0)$, $\Delta C^*(0)$, and a constant β as Formula 21 to calculate the lightness $L^*(0)$, chroma $C^*(0)$, and hue $h(0)$. However, β is a constant having a value ranging from 0 to 1.

$$C^*(0) = C^*_{709} + \Delta C^*(0) \times \beta$$

$$L^*(0) = L^*_{709} \Delta L^*(0) + \{\Delta C^*(0) \times (1-\beta)\} \times (F(h_{709}) + T)$$

$$h(0) = h_{709} \tag{21}$$

Next, similarly to Formulas 14 to 17, the RGB signal values R(0), G(0), and B(0) in displaying the corrected color information $(L^*(0), C^*(0), h(0))$ on the display device are calculated from the lightness $L^*(0)$, chroma $C^*(0)$, and hue $h(0)$ (S502).

Here, whether or not R(0), G(0), and B(0) all fall within a range from 0 to 1 is determined (S503).

In a case where R(0), G(0), and B(0) all fall within a range from 0 to 1, the correction unit 108 outputs R(0), G(0), and B(0) as the corrected image signal 109 to the display device 120 (S504).

On the other hand, in a case where any of R(0), G(0), and B(0) does not fall within a range from 0 to 1, the correction unit 108 sends R(0), G(0), and B(0) to the setting unit 106. The setting unit 106 calculates the correction quantities ΔL*(1) and ΔC*(1) of the lightness and chroma respectively as Formula 22 to send to the correction unit 108 (S505).

$$\Delta C^*(1) = \frac{\Delta B^*}{2 \times (F(h_{709}) + T)} \quad (22)$$

$$\Delta L^*(1) = \frac{\Delta B^*}{2}$$

The correction unit 108, similarly to Formula 21, calculates the lightness L*(1), chroma C*(1), and hue h(1) to calculate, similarly to Formulas 14 to 17, the RGB signal values R(1), G(1), and B(1) in displaying the color information (L*(1), C*(1), h(1)) on the display device 120 (S506).

Here, assuming that the RGB signal values are represented as R(k), G(k), and B(k) in a generalized form using a number k of updates, whether or not R(k), G(k), and B(k) all fall within a range from 0 to 1 is determined (S507).

Depending on the values of R(k), G(k), and B(k), the correction quantities of the lightness and chroma are updated to ΔL*(k+1) and ΔC*(k+1) respectively as shown by Formula 23 and Formula 24.

1. Case where R(k), G(k), and B(k) all fall within a range from 0 to 1 (S508)

$$\Delta C^*(k+1) = \Delta C^*(k) + \frac{\Delta B^*}{2^{k+1} \times (F(h_{709}) + T)} \quad (23)$$

$$\Delta L^*(k+1) = \Delta B^* - \Delta C^*(k+1) \times (F(h_{709}) + T)$$

2. Case where any of R(k), G(k), and B(k) does not fall within a range from 0 to 1 (S509)

$$\Delta C^*(k+1) = \Delta C^*(k) - \frac{\Delta B^*}{2^{k+1} \times (F(h_{709}) + T)} \quad (24)$$

$$\Delta L^*(k+1) = \Delta B^* - \Delta C^*(k+1) \times (F(h_{709}) + T)$$

Further, depending on the calculated correction quantities ΔL*(k+1) and ΔC*(k+1), and the constant β, the lightness L*(k+1), chroma C*(k+1), and hue h(k+1) are updated as Formula 25.

$$C^*(k+1) = C^*_{709} + \Delta C^*(k+1) \times \beta$$

$$L^*(k+1) = L^*_{709} + \Delta L^*(k+1) + \{\Delta C^*(k+1) \times (1-\beta)\} \times (F(h_{709}) + T)$$

$$h(k+1) = h(k) \quad (25)$$

Similarly to Formulas 14 to 17, the RGB signal values R(k+1), G(k+1), and B(k+1) in displaying the color information (L*(k+1), C*(k+1), h(k+1)) on the display device 120 are calculated (S510).

Here, values of $L_{Diff}$ and $C_{Diff}$ as the difference values of the lightness and chroma respectively are calculated as shown by Formula 26 to check a magnitude relationship between $L_{Diff}$ and a predefined threshold $L_{TH}$ of the lightness, and a magnitude relationship between $C_{Diff}$ and a predefined threshold $C_{TH}$ of the chroma (S511).

$$L_{Diff} = L^*(k+1) - L^*(k)$$

$$C_{Diff} = C^*(k+1) - C^*(k) \quad (26)$$

In a case where both conditions of $L_{Diff} \leq L_{TH}$ and $C_{Diff} \leq C_{TH}$ are met, R(k+1), G(k+1), and B(k+1) are output as the corrected image signal 109 to the display device 120 (S504).

In a case where any condition of $L_{Diff} \leq L_{TH}$ and $C_{Diff} \leq C_{TH}$ is not met, the correction unit 108 sends R(k+1), G(k+1), and B(k+1) to the setting unit 106, and the setting unit 106 further updates the lightness and chroma.

In the subsequent processes, steps S507 to S511 are repeated. At step S511, in the above described embodiment, the difference of the lightness and the difference of the chroma are compared with the thresholds thereof respectively to determine the conditions. As another method, at step S511, the processes may be repeated until a condition is met that the number k of updates reaches a predefined constant N.

If at step S511, the condition is determined to be met, the correction unit 108 outputs the finally calculated RGB signal values R(k), G(k), and B(k) as the corrected image signal 109.

As described above, according to the embodiment, when the color information is corrected, which is obtained by converting the input image signal having the wide color gamut held by the input image signal into the color gamut of the display device, such that the color information exists in the color gamut of the display device 120 and the brightness the same as the color of the wide color gamut is to be perceived, the correction can be performed so as to make the chroma large as much as possible.

Third Embodiment

A description is given of a third embodiment. The embodiment has a general configuration the same as the first embodiment, and thus a difference from the first embodiment is described.

Figure 7:
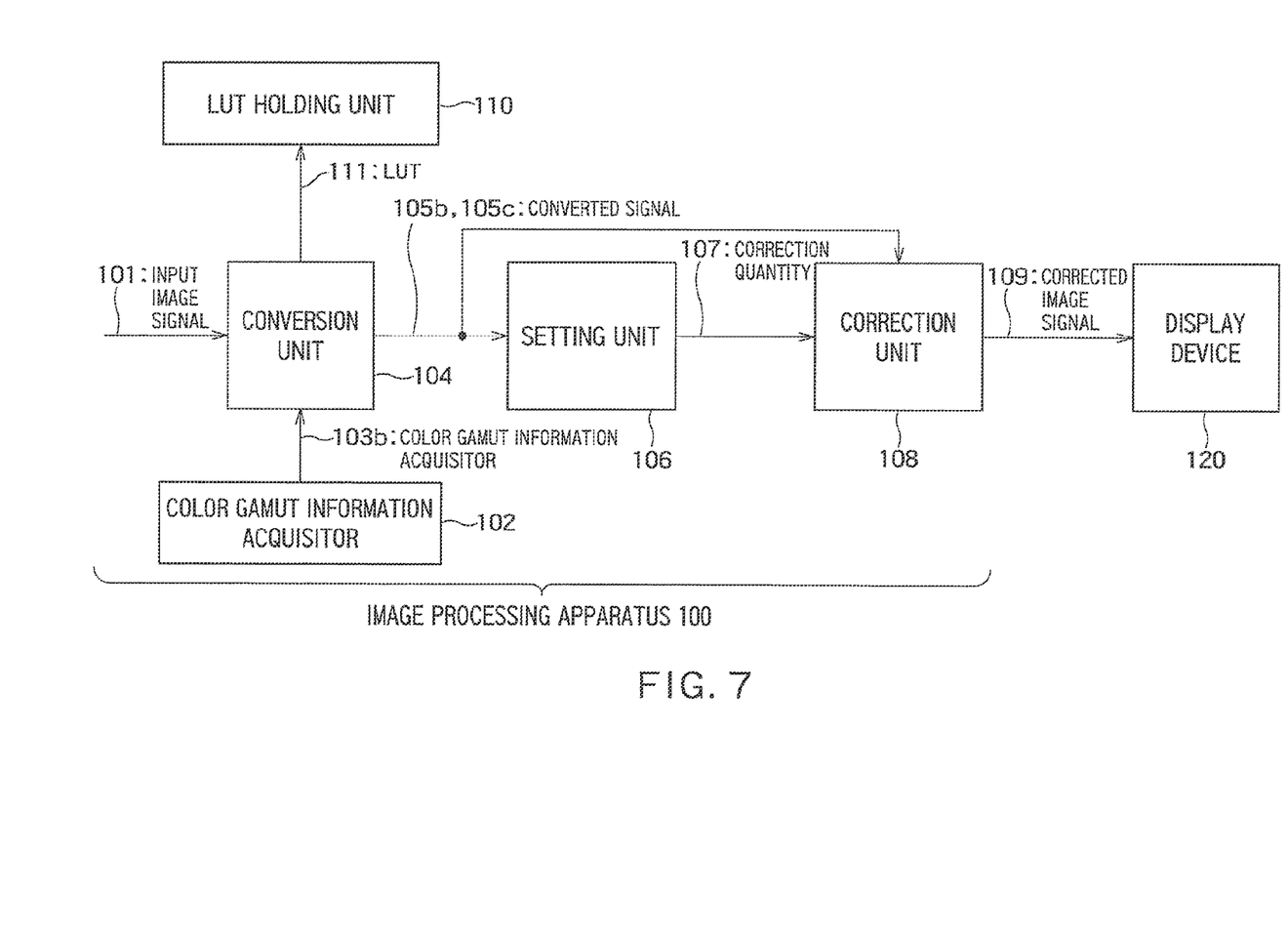
FIG. 7 is a diagram of an image display device according to a third embodiment.

FIG. 7 shows a configuration diagram of an image display device according to the embodiment. Components the same as those in FIG. 1 are denoted by the same reference signs and duplicated description is omitted except for extended processes.

In the first embodiment, the color gamut of the display device 120 is a color gamut defined by BT.709 and the color gamut of the input image signal is a color gamut defined by BT.2020, and the color gamut of the display device 120 is far smaller than the color gamut of the input image signal. In this embodiment, a description is given of a case where the color gamut of the input image signal is also a color gamut defined by BT.709 similar to the display device 120.

In the embodiment, a look-up table (LUT) holding unit 110 is added. The LUT holding unit 110 has a LUT 111. The LUT 111 is a table for converting the input image signal having a narrow color gamut into the color information having a color gamut (third color gamut) wider than that.

The LUT 111 may be a LUT which is created estimating the color information of an imaging target (e.g., sea's color, flower's color) with taking into account characteristics of an imaging apparatus imaging the input image signal 101, or a LUT which is created estimating the color information of the imaging target with averagely taking into account a general imaging apparatus in a case where the imaging apparatus is unknown like a TV broadcast wave. The LUT in this case is for restoring a video to an original color gamut wider than that of the Imaging apparatus, the video being generated in a manner that an imaging target originally having had a wider color gamut is compressed into a narrower color gamut as a result from imaging. The LUT 111 is not limited to those, and may be any so long as the color information is obtained by converting the color gamut of the input image to another color gamut.

The conversion of the color gamut may be done using not the LUT format but a function for nonlinear conversion.

The conversion unit 104 acquires the color gamut information 103b of the display device from the color gamut information acquisitor 102 to convert the input image signal similarly to Formula 1 to Formula 5 and calculate the color information ($L^*_{709}$, $C^*_{709}$, $h_{709}$).

The conversion unit 104 acquires the LUT 111 from the LUT holding unit 110 for converting the color gamut of the input image signal.

The conversion unit 104 refers the LUT 111 with respect to the RGB signal values ($R_{in}$, $G_{in}$, $B_{in}$) as signals after the gamma conversion of the input image signal to calculate the color information ($L^*_{LUT}$, $C^*_{LUT}$, $h^*_{LUT}$) of the color gamut different from the color gamut of the input image.

The conversion unit 104 sends the color information ($L^*_{709}$, $C^*_{709}$, $h_{709}$) as the converted signal 105b and the color information ($L^*_{LUT}$, $C^*_{LUT}$, $h^*_{LUT}$) as the converted signal 105c to the setting unit 106 and the conversion unit 108.

The setting unit 106 and the conversion unit 108 substitute the color information ($L^*_{LUT}$, $C^*_{LUT}$, $h^*_{LUT}$) for the color information ($L^*_{2020}$, $C^*_{2020}$, $h^*_{2020}$) in the first and second embodiments to perform the processes similar to the first and second embodiments. This calculates the correction quantity 107 of the lightness and chroma and the corrected image signal 109 converted from the converted signal 105b.

As described above, according to the embodiment, the color information obtained by converting the input image signal into the color gamut of the display device is corrected so as to be able to perceive the brightness the same as the color information obtained by converting the input image signal using the LUT, allowing a user to perceive the brightness the same as the color gamut of the LUT also in displaying on the display device having the narrow color gamut.

Figure 8:
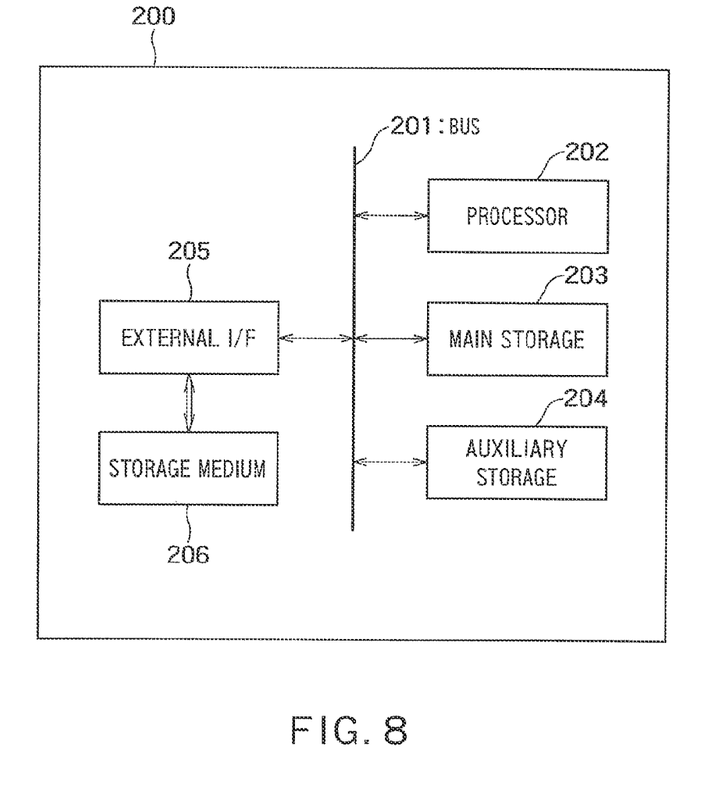
FIG. 8 is a diagram that illustrates a hardware configuration of an image processing device according to an embodiment.

FIG. 8 is a diagram that illustrates a hardware configuration of an image processing device according to an embodiment of the present invention.

The image processing device of each embodiment can be realized by using a general-purpose computer device as basic hardware as illustrated in, for example, FIG. 8. In this computer device 200, a processor 202 such as a CPU, a memory 203 and an auxiliary storage 204 such as a hard disk are connected with a bus 201, and a storage medium 206 is further connected via an external I/F 205. The external I/F 205 may connect to an image displaying device. Each processing block in the image processing device can be realized by making the processor 202 mounted on the above-mentioned computer device execute a program. Any combination of these blocks may constitute circuitry. At this time, the image processing device may be realized by installing the above-mentioned program in the memory 203 or the auxiliary storage 204 of the computer device beforehand, or may be realized by storing it in the storage medium 206 such as a "CD-ROM" or distributing the above-mentioned program through a network and arbitrarily installing this program in the computer device. Moreover, each buffer in the image processing device can be realized by arbitrarily using the memory 203, the hard disk 204 or the storage medium 206 such as a "CD-R", a "CD-RW", a "DVD-RAM" and a "DVD-R", which are incorporated or attached to the above-mentioned computer device.

Furthermore, the image processing apparatus may include a CPU (Central Processing Unit), a ROM (Read Only Memory) and a RAM as one example of circuitry. In this case, each unit or each element in the image processing apparatus as shown in FIG. 1, 5 or 7 can be controlled by a CPU's reading out into a RAM and executing a program which is stored in a storage or ROM.

Also, the above-stated hardware configuration is one example and a part or all of the image processing apparatus according to an embodiment can be realized by an integrated circuit such as a LSI (Large Scale Integration) or an IC (Integrated Circuit) chip set as one example of circuitry. Each function block in the image processing apparatus can be realized by a processor, individually, or a part or all of the function blocks can be integrated and realized by one processor. A means for the integrating the part or all of the function blocks is not limited to the LSI and may be dedicated circuitry or a general-purpose processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An image processing apparatus comprising:
first circuitry configured to calculate a difference between a brightness of first color information expressed in a first color gamut of a first device and a brightness of the first color information expressed in a second color gamut of a second device, the first color information including a first lightness and a first chroma, and to calculate a first correction quantity corresponding to a correction quantity of the first lightness and a second correction quantity corresponding to a correction quantity of the first chroma so as to represent the difference based on a relationship formula involving lightness, chroma and brightness; and
second circuitry configured to output second color information including a second lightness and a second chroma, the second lightness corresponding to corrected lightness of the first lightness by the first correction quantity and the second chroma corresponding to corrected chroma of the first chroma by the second correction quantity, wherein
the first circuitry is configured to find a portion in which values of the lightness and the chroma are equal to or lamer than values of the lightness and the chroma of the first color information in a graph representing a relationship between the lightness and the chroma capable of representing a brightness obtained by correcting the brightness of the first color information expressed in the first color gamut by a quantity depending on the difference, and to calculate the first correction quantity and the second correction quantity such that the second lightness and the second chroma correspond to a point which internally divides the portion by a given ratio.

2. The apparatus according to claim 1, wherein the first circuitry is configured to calculate the first correction quantity such that a value of the first chroma becomes larger.

3. The apparatus according to claim 1, wherein the first circuitry is configured to, when the internal dividing point is positioned outside a boundary of the first color gamut, calculate the first correction quantity and the second correction quantity such that the second lightness and the second chroma correspond to an intersection between the boundary of the first color gamut and a line connecting between the internal dividing point and a point representing the first color information.

4. The apparatus according to claim 1, wherein the first circuitry is configured to find a portion in which values of the lightness and the chroma are equal to or larger than values of the lightness and the chroma of the first color information in a graph representing a relationship between the lightness and the chroma capable of representing a brightness obtained by correcting the brightness of the first color information expressed in the first color gamut by a quantity depending on the difference and which is included in the first color gamut, and to calculate the first correction quantity and the second correction quantity such that the second lightness and the second chroma correspond to a point which internally divides the portion by a given ratio.

5. The apparatus according to claim 1, wherein the first color information includes a first hue, the second color information includes a second hue, and the first circuitry is configured to calculate the first correction quantity and the second correction quantity such that the second hue is maintained to have same hue as that of the first hue.

6. The apparatus according to claim 1, wherein the first color gamut is wider than the second color gamut, and the apparatus further comprises third circuitry configured to generate the first color information by performing color conversion on an input image signal on a basis of the first color gamut, and to generate second color information by performing color conversion on the input image signal on a basis of the second color gamut.

7. The apparatus according to claim 1, wherein the apparatus further comprises third circuitry configured to generate the second color information by performing color conversion on an input image signal on a basis of the second color gamut, and to generate the first color information by performing color conversion on the input image signal on a basis of a third color gamut wider than the first and second color gamuts.

8. The apparatus according to claim 1, wherein the relationship formula among lightness, chroma and brightness is:

$$B^* = L^* + (F(h)+T) \times C^*$$

wherein B* is brightness, L* is lightness, "F" is a function for outputting a value depending on a hue, "T" is a constant, and C* is chroma.

9. An image processing method comprising:
calculating a difference between a brightness of first color information expressed in a first color gamut of a first device and a brightness of the first color information expressed in a second color gamut of a second device, the first color information including a first lightness and a first chroma;
calculating a first correction quantity corresponding to a correction quantity of the first lightness and a second correction quantity corresponding to a correction quantity of the first chroma so as to represent the difference based on a relationship formula involving lightness, chroma and brightness;
outputting second color information including a second lightness and a second chroma, the second lightness corresponding to a corrected lightness of the first lightness by the first correction quantity and the second chroma corresponding to a corrected chroma of the first chroma by the second correction quantity, wherein
the calculating of the first correction quantity and the second correction quantity comprises:
finding a portion in which values of the lightness and the chroma are equal to or lamer than values of the lightness and the chroma of the first color information in a graph representing a relationship between the lightness and the chroma capable of representing a brightness obtained by correcting the brightness of the first color information expressed in the first color gamut by a quantity depending on the difference; and
calculating the first correction quantity and the second correction quantity such that the second lightness and the second chroma correspond to a point which internally divides the portion by a given ratio.

10. An image processing apparatus comprising:
a processor; and
a memory configured to store data based on a relationship formula involving lightness, chroma and brightness and to store processor-executable instructions that, when executed by the processor, cause the processor to:
calculate a difference between a brightness of first color information expressed in a first color gamut of a first device and a brightness of the first color information expressed in a second color gamut of a second device, the first color information including a first lightness and a first chroma;
calculate a first correction quantity corresponding to a correction quantity of the first lightness and a second correction quantity corresponding to a correction quantity of the first chroma so as to represent the difference based on the relationship; and
output second color information including a second lightness and a second chroma, the second lightness corresponding to a corrected lightness of the first lightness by the first correction quantity and the second chroma corresponding to a corrected chroma of the first chroma by the second correction quantity, wherein
the calculating of the first correction quantity and the second correction quantity comprises:
finding a portion in which values of the lightness and the chroma are equal to or larger than values of the lightness and the chroma of the first color information in a graph representing a relationship between the lightness and the chroma capable of representing a brightness obtained by correcting the brightness of the first color information expressed in the first color gamut by a quantity depending on the difference; and
calculating the first correction quantity and the second correction quantity such that the second lightness and the second chroma correspond to a point which internally divides the portion by a given ratio.

* * * * *